US009633641B2

(12) United States Patent
Bergman (10) Patent No.: US 9,633,641 B2
(45) Date of Patent: Apr. 25, 2017

(54) GRID BASED USER INTERFERENCE FOR CHORD PRESENTATION ON A TOUCH SCREEN DEVICE

(71) Applicant: Berggram Development Oy, Helsinki (FI)

(72) Inventor: Jussi Bergman, Helsinki (FI)

(73) Assignee: Berggram Development Oy, Helsinki (FI)

( * ) Notice: Subject to any disclaimer, the term of this patent is extended or adjusted under 35 U.S.C. 154(b) by 0 days.

(21) Appl. No.: 14/895,499

(22) PCT Filed: Jun. 4, 2014

(86) PCT No.: PCT/FI2014/050454
§ 371 (c)(1),
(2) Date: Dec. 3, 2015

(87) PCT Pub. No.: WO2014/195584
PCT Pub. Date: Dec. 11, 2014

(65) Prior Publication Data
US 2016/0140944 A1   May 19, 2016

(30) Foreign Application Priority Data
Jun. 4, 2013   (FI) .................................. 20135621

(51) Int. Cl.
*G10H 1/38* (2006.01)
*G06F 3/0488* (2013.01)
*G06F 3/041* (2006.01)

(52) U.S. Cl.
CPC ............. *G10H 1/383* (2013.01); *G06F 3/041* (2013.01); *G06F 3/04886* (2013.01); *G10H 1/38* (2013.01);
(Continued)

(58) Field of Classification Search
CPC ........................................................ G10H 1/38
(Continued)

(56) References Cited

U.S. PATENT DOCUMENTS 5,650,584 A * 7/1997 Shinsky ............... G10H 1/0025
84/613
5,777,251 A * 7/1998 Hotta .................... G10H 1/0008
84/609
(Continued)

FOREIGN PATENT DOCUMENTS

CN   103035253 A   4/2013

OTHER PUBLICATIONS

Liine Lemur, User Manual [online]. Nov. 17, 2012. Chapter 12, p. 110.
(Continued)

*Primary Examiner* — David Warren
(74) *Attorney, Agent, or Firm* — BelayIP Oy (57) ABSTRACT

Improvisation or playing along with a musical group or with a song is enjoyable to people and musicians of all ability levels. However, it is easy to play notes which do not harmonize with other notes and pitches which are being played. Provided herein is a method, computer program product and electronic device for assigning a set of pitches to a plurality of cells of an electronic device having a touch screen input device. The method may include the steps of obtaining an input chord, disassembling the chord into at least one base note and a plurality of individual voices, arranging a predetermined number of voices of the chord according to at least one predefined rule, and assigning at least one set of pitches to a plurality of cells of an electronic device, said set of pitches corresponding to the base note and arranged predetermined number of voices of the chord. The present method allows a musician to freely play along
(Continued)

without the possibility of playing an errant note as the user does not control the actual pitch associated with the cells being indicated by a user on the touch screen.

10 Claims, 5 Drawing Sheets

(52) U.S. Cl.
CPC ....... *G10H 1/386* (2013.01); *G10H 2210/066* (2013.01); *G10H 2210/571* (2013.01); *G10H 2220/096* (2013.01); *G10H 2220/106* (2013.01); *G10H 2220/241* (2013.01); *G10H 2220/251* (2013.01); *G10H 2230/015* (2013.01)

(58) Field of Classification Search
USPC .................................................. 84/613, 615
See application file for complete search history.

(56) References Cited

U.S. PATENT DOCUMENTS

| | | | | |
|---|---|---|---|---|
| 6,046,396 | A * | 4/2000 | Miyamoto | G10H 1/0008 84/613 |
| 6,057,503 | A * | 5/2000 | Shinsky | G10H 1/0025 84/613 |
| 6,156,965 | A * | 12/2000 | Shinsky | G10H 1/0025 84/650 |
| 6,156,966 | A * | 12/2000 | Shinsky | G10H 1/0025 84/613 |
| 6,372,975 | B1 * | 4/2002 | Shinsky | G10H 1/0025 84/612 |
| 6,441,289 | B1 * | 8/2002 | Shinsky | G10H 1/0025 84/464 R |
| 6,448,486 | B1 * | 9/2002 | Shinsky | G10H 1/0025 84/613 |
| 7,196,260 | B2 * | 3/2007 | Schultz | G10H 1/38 379/374.01 |
| 7,273,979 | B2 * | 9/2007 | Christensen | G10H 1/0066 200/512 |
| 8,465,366 | B2 * | 6/2013 | Applewhite | G10H 1/368 463/36 |
| 8,802,955 | B2 * | 8/2014 | Bergman | G10H 1/38 84/613 |
| 8,822,803 | B2 * | 9/2014 | Terry | G10H 1/34 84/644 |
| 8,901,406 | B1 * | 12/2014 | Buskies | G10H 1/04 84/615 |
| 2004/0112203 | A1 * | 6/2004 | Ueki | G10H 1/0008 84/613 |
| 2007/0240559 | A1 * | 10/2007 | Hasebe | G10H 1/386 84/637 |
| 2008/0280680 | A1 * | 11/2008 | Dutilly | A63F 13/00 463/36 |
| 2009/0126553 | A1 * | 5/2009 | Murray | G10G 1/02 84/485 R |
| 2010/0224051 | A1 * | 9/2010 | Kurebayashi | G10H 1/22 84/637 |
| 2010/0287471 | A1 * | 11/2010 | Nam | G06F 3/011 715/702 |
| 2010/0288108 | A1 * | 11/2010 | Jung | G06F 3/0488 84/610 |
| 2011/0146477 | A1 * | 6/2011 | Tsukamoto | G09B 15/003 84/485 R |
| 2011/0283868 | A1 * | 11/2011 | Behringer | G10H 1/0008 84/622 |
| 2012/0160079 | A1 * | 6/2012 | Little | G10H 1/38 84/613 |
| 2012/0174735 | A1 * | 7/2012 | Little | G10H 1/0008 84/613 |
| 2012/0254751 | A1 * | 10/2012 | Kim | G06F 3/165 715/716 |
| 2013/0104725 | A1 * | 5/2013 | Little | G10H 1/0025 84/613 |
| 2013/0111346 | A1 * | 5/2013 | Little | G06F 3/0482 715/716 |
| 2014/0026738 | A1 * | 1/2014 | Noddings | G09B 15/023 84/478 |
| 2014/0051512 | A1 * | 2/2014 | Rasanen | A63F 13/00 463/31 |
| 2014/0055400 | A1 * | 2/2014 | Reuschel | G06F 3/041 345/173 |
| 2014/0083279 | A1 * | 3/2014 | Little | G10H 1/0008 84/609 |
| 2014/0349761 | A1 * | 11/2014 | Kruge | 463/35 |
| 2015/0135108 | A1 * | 5/2015 | Pope | G06K 9/00006 715/767 |
| 2015/0220161 | A1 * | 8/2015 | Ryabchenko | G06F 3/0216 345/169 |
| 2015/0228202 | A1 * | 8/2015 | Yun | G09B 15/08 84/477 R |
| 2015/0268926 | A1 * | 9/2015 | Panaiotis | G06F 3/167 715/716 |
| 2015/0293607 | A1 * | 10/2015 | Wu | G06F 3/0235 345/169 |
| 2015/0331659 | A1 * | 11/2015 | Park | G10H 1/0083 700/94 |
| 2016/0019810 | A1 * | 1/2016 | Rodriguez | G09B 15/009 84/478 |
| 2016/0048668 | A1 * | 2/2016 | Zafiris | G06F 21/32 726/19 |
| 2016/0104471 | A1 * | 4/2016 | Hyna | G10H 1/28 84/613 |
| 2016/0140944 | A1 * | 5/2016 | Bergman | G06F 3/041 84/613 |

OTHER PUBLICATIONS

Piano scales and jam. iPad app descripton and video.Jul. 8, 2012. http://www.youtube.com/watch?v=eV5m5KQC9lg.

Mariën Koen: Your Song (Chord progression SLOW for iOs GarageBand), youtube, Dec. 5, 2012, XP055146803. http://www.youtube.com/watch?v=DiBZIF_YJrM.

Roger Linn Design: LinnStrument—Air on a G String. Youtube. Jun. 13, 2011. XP055147193. http://www.youtube.com/watch?v=kqT25dlf1OQ.

* cited by examiner

GRID BASED USER INTERFERENCE FOR CHORD PRESENTATION ON A TOUCH SCREEN DEVICE

FIELD OF INVENTION

The present invention generally relates to the field of playing music on an electronic device with a touch screen or similar input type device. More particularly, embodiments of the present invention relate to the arrangement and distribution of pitches to cells of a grid in a user interface on such devices. Examples of the present invention are particularly well suited for beginner and intermediate musician improvisation, wherein the musician can play along with predefined chords, music or videos without the possibility of playing a note which is not in harmony with the rest of the music.

BACKGROUND OF THE INVENTION

Improvisation, playing along with a musical group or to a song/audio file is enjoyable to people and musicians of all ability levels. However, as anyone who has tried this knows, it is easy to play notes which do not harmonize with other notes and pitches which are being played.

This is due to the fact that music is played within the confines of chords, and with chord progressions. Chords have a series of predefined sharp and flat notes, at predefined intervals, which when played properly are harmonious. However, it takes much training and practice in order to learn all of the rules of chord construction and harmonization. This can be daunting to musicians without the necessary skills. Additionally, even for skilled musicians, other tasks such as singing, performing and/or playing multiple instruments simultaneously may lead to the errant not being played, which can stand out to even the most untrained ear.

Therefore, there exists a need to ensure that musicians of all ability levels are able to play music, and to control virtually all aspects of play, without needing to worry about the complex rules of chord construction, chord progression and harmony. Several attempts have been made to this end but have failed in certain aspects. Within prior art solutions, the user must either be advanced enough that they are able to input the proper chord, and change chords at the proper time, which is more advanced than many lower level musicians, or the prior art solutions limit to much of the user's ability to improvise and express themselves as they wish.

Additionally, there exists a need for providing a suitable graphical user interface for enabling a player to play or improvise music on a standard touch screen device or similar type input device with varying assigned pitches which extends beyond a simple graphical reproduction of a standard musical keyboard.

SUMMARY OF THE INVENTION

The invention is based on a method for causing an electronic device having a touch screen input device to provide a graphical user interface for allowing a user to play or improvise music, said program being configured to cause the electronic device to execute the method comprising the steps of defining a plurality of cells on a touch screen input display of the electronic device, obtaining an input chord, disassembling the chord into at least one base note and a plurality of individual voices, arranging a predetermined number of voices of the chord according to at least one predefined rule, and assigning at least one set of pitches to a plurality said cells, said set of pitches corresponding to the base note and arranged predetermined number of voices of the chord.

The invention also relates to an electronic device and a computer readable storage medium including a software code for performing the method.

Input chords can come in a variety of types, such as being typed in alphanumeric format into a text box or text editor, either of which being separate from or integral with a computer program product of the present invention, loaded in alphanumeric format from a text file, retrieved from an audio source by using a chord detection algorithm, read from chord information associated with and/or paired to an audio source or created from an audio file, wherein the audio file can be recorded, streaming and/or directly retrieved from a microphone and/or input from a live sound.

Additionally, the input chord can change dynamically during play. When a new chord is input, detected or changed, the computer program product can obtain the new input chord, disassembling the new chord into at least one base note and a plurality of individual voices, arranging a predetermined number of voices of the chord according to at least one predefined rule and reassigning a new set of pitches corresponding to the new base note and new arranged predetermined number of voices of the new chord to said plurality of cells on a touch screen input display of the electronic device in response to an event.

DETAILED DESCRIPTION OF EXEMPLARY EMBODIMENTS

The present invention generally relates to a way of processing chord progressions for an electronic device. A base note and four voices, typically the three or four most important voices of a chord, regardless of the complexity of the chord are packaged in to a set of pitches which can then be distributed to a plurality of input devices, such as physical keys or defined cells on a touch screen input, of an electronic device. The result of certain embodiments is that a person playing an electronic device can play or improvise music by controlling all aspects of their play besides the actual pitch of each physical key they depress. This allows people to improvise without worrying about playing individual notes which may or may not work within the current chord progression.

As described herein, physical keys are a term representative of all possible input devices which are capable of inputting to an electronic device a person's intent to cause the device, or an auxiliary device, to produce a musical note. Therefore, the term physical keys is utilized to describe the input device of whatever electronic device and/or instrument is present in a given embodiment. Touch screen inputs encompass all forms of actual touch screen displays, e.g. displays which are touch sensitive, as well as displays which mimic touch screens but which actually derive the input from something besides the actual pressure of an input on a display.

A logic unit is disclosed, which when utilized, can guarantee that the independent voices of subsequent chords make only small movements. Additionally, embodiments of the logic unit, when utilized, can ensure that voices of a chord never cross over each other on a key board. Furthermore, the logic unit is capable of achieving these tasks with a simple set of procedures which allow for real-time processing with little or no lag.

A distributor is disclosed, wherein when utilized, is capable of distributing the base note and additional voices of a chord, in a specific order, to a plurality of defined cells on a touch screen display. Therefore, the distributer is capable of assigning specific pitches to, for example a set of user interface elements. Thus, playing and improvising becomes dramatically easier and possible for musicians of all levels, from beginners and those with disabilities to professionals. Regardless of what cells are selected, the outcome sounds natural and personal, as if played by an experienced musician.

For example, the individual voices of a single chord (C, F, Dm7, G7, C) in a particular moment in time (t1, t2, t3, t4, t5) can be distributed in an intuitive and useful manner to a display screen via a plurality of defined cells. The new pitches and the distribution of the new pitches (voices in a chord) can be implemented so that the chord progression always flows smoothly, regardless of the complexity of chords or chord progressions.

According to an embodiment of the present invention, there is provided herein a method of assigning a set of pitches to a plurality of defined cells on a touch screen display. The method comprises the computer implemented steps of obtaining an input chord, arranging a number of voices of the chord and assigning at least one set of pitches to a plurality of defined cells on a touch screen display of an electronic device.

Additionally, according to certain embodiments of the present invention there is a computer program product, e.g. a non-transitory computer readable medium having stored there on a set of computer executable instructions, for assigning a set of pitches to a plurality of defined cells on a touch screen display of an electronic device in accordance with the methods disclosed herein.

Moreover, a method may comprise the steps of disassembling the chord into at least one base note and a plurality of individual voices. The voices of the chord may be arranged according to at least one predefined rule, as will be discussed in more detail below. Additionally, the base note and additional voices may form part of, or an entire set of pitches which are thus assigned to a plurality of physical keys of an electronic device.

Figure 1:
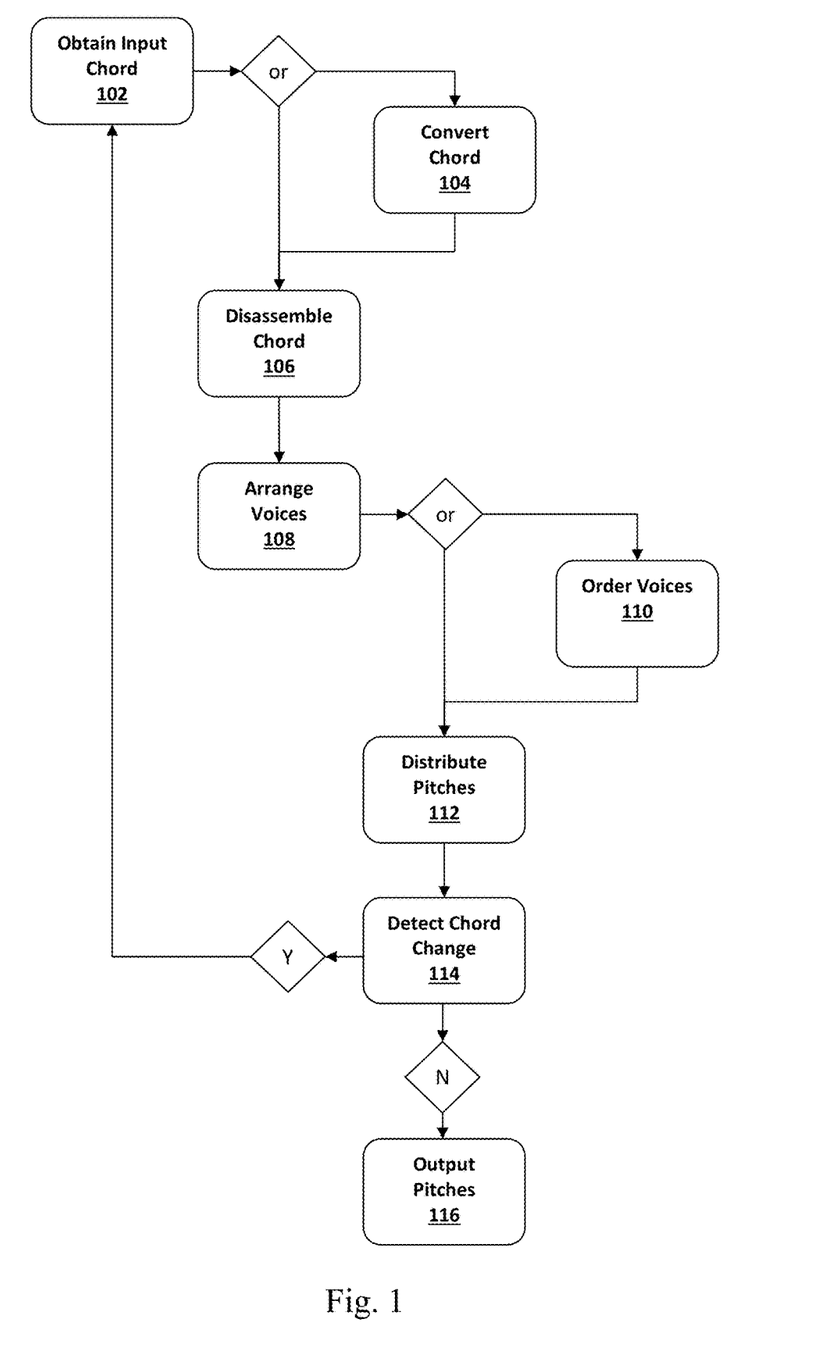
FIG. 1 shows a flow chart of an embodiment of the present invention.

An example of a method in accordance with the present invention is provided in FIG. 1. The method begins by obtaining an input chord 102. The input chord is either converted in to a common naming convention 104 or pass directly on to a disassembler. The disassembler disassembles the input chord in to a predetermined number of desired voices 106. The desired voices are then arranged 108 and either ordered 110 or pass directly on to a distributor. Once the desired voices of the input chord are arranged and optionally ordered, the desired voices are distributed to a plurality of defined cells on a touch screen display of an electronic device 112. A user can then play the electronic device by indicating one or more of the plurality of defined cells at a given time. If no change in chord is detected 114 then the pitches which are output 116 correspond to the assigned desired voices of the input chord. If a change in the chord is detected 114 then the system obtains the new chord and repeats the method in order to distribute the new pitches 112 to the plurality of keys.

Chords may be written or pre-written, for example, in a text-editor tool of a computer program product. Additionally, chords can be written or pre-written using alphanumeric representations, e.g. C, CM (for C major), CM6 (for the $6^{th}$ major C chord), etc, in any type of text file or computer readable file or medium. Many chords and chord progressions for songs can be found in alphanumeric format online and simply copy and pasted in to the present computer program product or uploaded/input in any other well known fashion.

Furthermore, the present computer program product can retrieve, detect and/or create chords. The present computer program product can also retrieve, detect and/or create the transition timing between two or more chords. These things can be accomplished directly or indirectly from audio sources and/or audio files in delayed or real-time. For example, the computer program product can utilize chord detection methods to determine the present chord in a live or recorded audio stream input or accessible to the computer program product or electronic device having the computer program product thereon, e.g. a youtube clip or a midi file from a CD-ROM.

Additionally, universally there are a plurality of chord naming conventions. While the computer program product may be equipped to handle multiple naming conventions directly, for example by having stored desired voices for chords in a plurality of naming conventions, the computer program product may also have a chord naming conversion unit, subunit or chart. Therefore, once a chord is retrieved it can be converted in to a common naming convention. The chord, in the common naming convention format can then be used within the remainder of the steps.

Still further, an audio source may be associated with chord information. Chord information may be manually entered and/or detected. The chord information is stored in computer readable format which is paired with the audio source. The computer program product can easily obtain information on the chord, and optionally timing information, for the audio source directly from the chord information. Similarly, a video source may be associated/paired directly with chord information or a combination of a video source, audio source and chord information may be created and/or used by the computer program product.

When a chord is detected, input and/or changed, for instance, the logical unit can receive the name of the chord or other identifying chord information as an input, e.g. Dm9. According to certain examples, the four most important voices of a chord are desired. However, according to certain examples, selected voices which are or are not a part of the four most important voices may be desired.

The desired voices, which for the present examples are the base note and the four most important voices of a chord, can be predefined and stored in a retrievable format such as a database or file of the or accessible to the computer program product. However, any desired voices can be predefined and stored for any give chord. Additionally, the desired voices may be determined or retrieved in another manner by the computer program product.

According to certain embodiments, a chord is input or accessible to the computer program product in alphanumeric format. When the chord is input, or detected/determined in another format, the chord may be translated in to a corresponding alphanumeric format.

For each chord, the corresponding base note and a plurality of voices can be predefined and stored in a computer readable memory. The plurality of voices may be, for example, the four most important voices of a standard chord or the three most important voices of a simple triad, such as CM, Fm, G, etc. The chord can then be disassembled by retrieving the base note and plurality of voices corresponding to the alphanumeric format of the input chord from the computer readable memory.

The desired voices of a chord, e.g. the base note and four most important voices, may be stored in alphabetic, numeric or alphanumeric format. According to certain embodiments, the voices are stored in numeric format, with the numbers corresponding to the keys on a musical keyboard. For example, with C=1, $C^\#/D_b$=2, D=3 and so on. However, one of ordinary skill will recognize countless manners in which to store the present information in a useful electronic format.

The desired voices for each of a plurality of chords may be directly stored in a computer readable for, such as a database or text file. Additionally, one or more rules for the distribution of desired voices associated with a set of master chords may be stored in computer readable form. The master chords are root key independent, e.g. m7, minor $7^{th}$ chords. A unit or subunit of the computer program product, and/or the disassemble, can break an input chord in to its root key and its master chord, e.g. Cm7 would be broken into its root key, 'C' and its master chord, minor $7^{th}$. The rules relating to the distribution of voices for the master chord can then be retrieved from the computer readable form and applied to the root key of the chord. The result is then the retrieval of the desired voices for the particular chord.

The system may also comprise a tuning unit or one or more tuning rules. As regions around the world have different music styles and harmonics, it is possible to tune one or more of the retrieved desired voices to better fit regional requirements without the necessity of determining an entirely new set of desired voices for each chord, or different rules for master chords, based on, e.g. geography.

In the example of an input chord being Dm9, the computer program product would retrieve, from a database accessible to the computer program product, the base note and four most important voices of Dm9, e.g. D, F, A, C & E, which may be retrieved in numeric format, as described above, as 3, 6, 10, 1 & 5, 3, or D would be the base note and 6, 10, 1 & 5 are the four most important voices. The desired voices may be stored and retrieved in any order.

Simple triads have only 3 voices. However, if it is desired to always have a set of 5 voices comprising the base note and four additional important voices, a fourth voice can be added to the three of the simple triad. The addition of a fourth voice will be described in more detail below.

A unit or subunit, which can be the disassembler, can receive the input chord as described above and output the desired voices, e.g. the three or four most important voices and the base note. These desired voices can then be passed to another unit or subunit, for example a re-arranger.

The computer program product may have a re-arranger unit, or a subunit, which is distinct or integrated into any other unit. The re-arranger receives the desired voices as an input and, in accordance with at least one rule, re-arranges some or all of the desired voices in to a set of pitches.

For re-arranging some or all of the desired voices an anchor key is selected. The anchor key preferably has associated therewith an anchor pitch. Additionally, the anchor key is preferably a single key selected from the plurality of defined cells on a touch screen display of a electronic device, or a representative physical key, e.g. the F key of a musical keyboard or the F key which has been assigned to a certain key on a computer keyboard.

The anchor key can be predetermined and independent of the input chord(s). Additionally, the anchor key may be the same in every cycle and/or with every input chord. For example, the anchor key can be associated with the anchor pitch F, otherwise denoted numerically as described above as 6. However, the anchor key may change and/or be influenced by one or more input chords.

According to certain embodiments, the desired voices will generally be arranged so that the desired voices will all be lower on a musical keyboard than the anchor pitch. Stated the other way around, the anchor pitch will be the highest pitch compared to the arranged desired voices. If one of the desired pitches is the anchor pitch it may remain at the same level as the anchor pitch or it may be transposed down an octave such that the anchor pitch is the true highest pitch compared to the arranged desired pitches.

Additionally, the desired voices will generally be arranged so that the desired voices will all be as close as possible to the anchor pitch. The arrangement can be accomplished through a variety of methods and programs using a plurality of rules. However, the end result will guarantee that the chord progression flows smoothly and that independent voices in a chord sequence do not cross each other, regardless of chords and chord progressions.

Therefore, according to certain embodiments, a predetermined number of voices of the chord are arranged in relation to the anchor pitch according to at least one predefined rule such that the anchor pitch is the highest pitch of the set of pitches and the predetermined number of voices are arranged to be the closest possible corresponding lower pitches with regards to the anchor pitch.

Furthermore, as described above, simple triads have only one base note and three voices. Therefore, when it is desired to have four voices and a base note, the re-arranger, or another portion of the computer program product, can add a fourth voice. According to one embodiment there is a doubling rule, wherein when a re-arranger receives an input of three voices, or a base note and three voices, the re-arranger will arrange the three voices, or base note and three voices, with respect to the anchor pitch such that the three voices, or base note and three voices, are arranged as close as possible, and below, the anchor pitch. Then the re-arranger, or other portion of the computer program product, will take the arranged voice closest to the anchor pitch, and add a fourth voice corresponding to the closest arranged voice which has been transposed down one octave.

Figure 2:
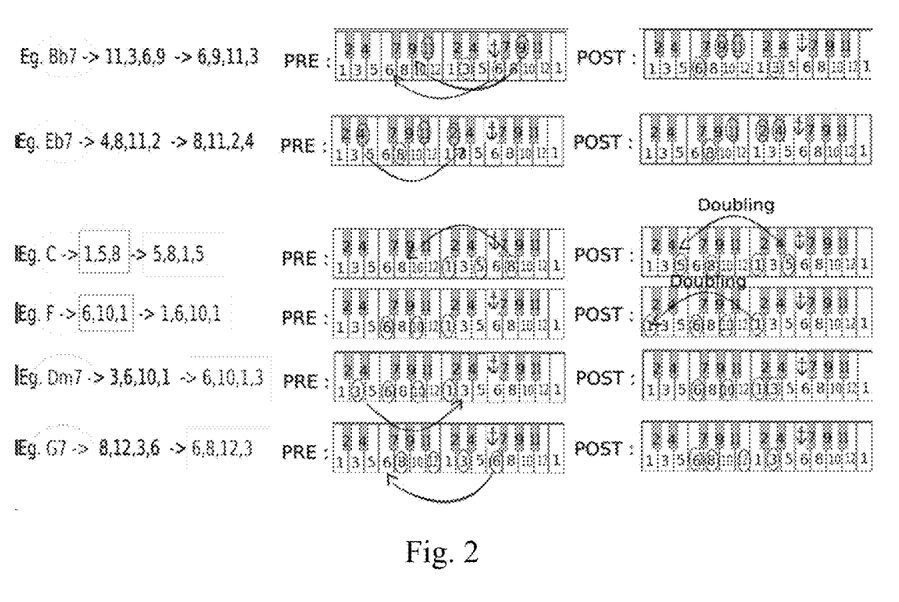
FIG. 2 shows a plurality of examples of pre and post arranged voices.

FIG. 2 shows a plurality of examples of the input chords, their desired voices (not including the base note) in their original ordering and then the re-arranged order. Additionally, there are two examples of chords C and F which show the doubling rule.

The voices are arranged around the anchor pitch and then examples of rules utilized in the arrangement are; voices higher than the anchor pitch are transposed down one octave, a voice equal to the anchor pitch is transposed down one octave, voices which are more than one octave below the anchor pitch and which are not doubled are transposed up one octave.

Figure 3:
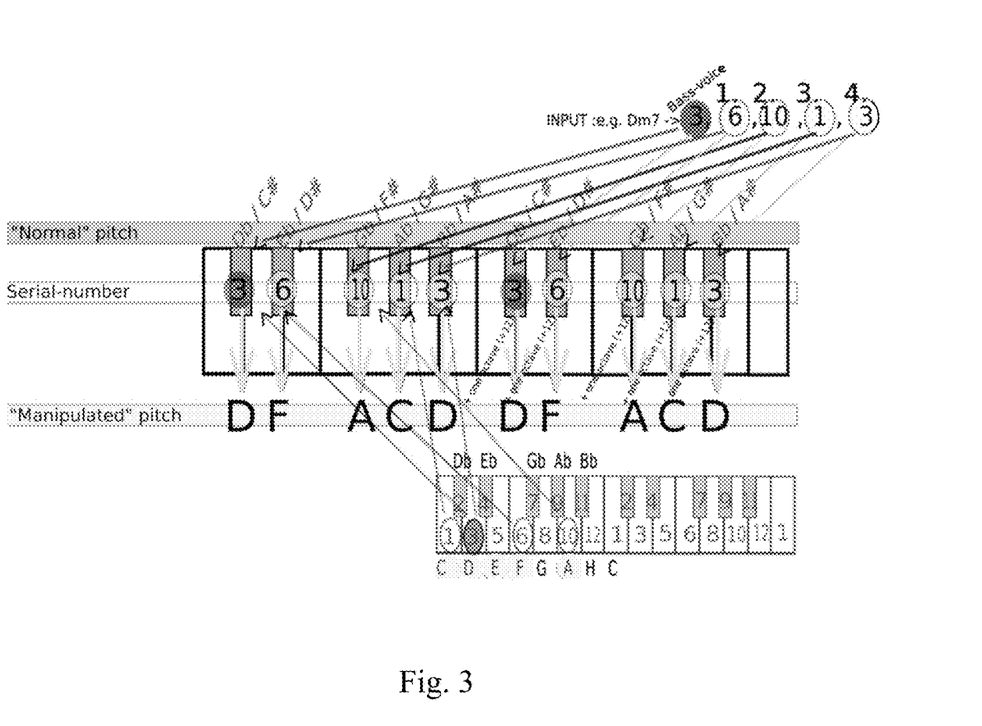
FIG. 3 shows an example distribution of a set of pitches on the black keys of a musical keyboard.

Once the voices have been arranged they can also be simply ordered, either by the re-arranger or some other portion of the computer program product. The order of the arranged voices can be in relation to their distance from an anchor key, wherein the first ordered arranged voice corresponds to the arranged voice furthest from the anchor key. Therefore, a set of voices is created, which may be the output of the re-arranger, which comprises; e.g. the base note and ordered arranged voices, the ordered arranged voices, or the ordered and arranged voices and base note. An example of the arrangement and ordering of input chord Dm7 can be seen in FIG. 3. Additionally, the distribution of the voices with regards to the keys can also be seen.

A distributor is provided which can assign the set of voices to a plurality of defined cells on a touch screen display of the electronic device. The distributor can maintain and/or have access to a midi manipulation database which has stored the set of voices corresponding to some or all of the defined cells on a touch screen display of the electronic device. Therefore, once a user selects or actuates a cell, the output sound is determined by the distributor.

Figure 4:
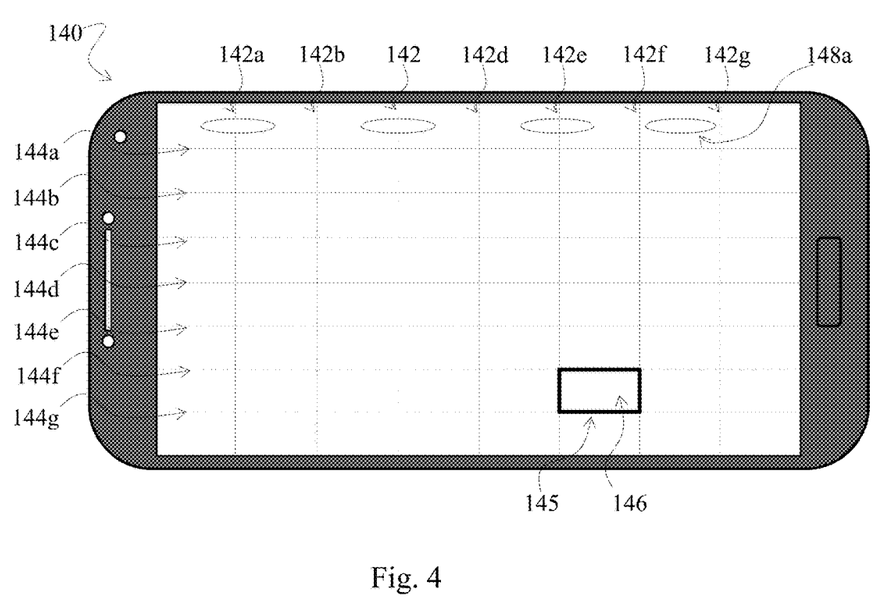
FIG. 4 shows an example of a mobile phone having a touch screen display and user interface according to an aspect of the present invention.

FIG. 4 shows an example of an electronic device 140 which has a touch screen display. A plurality of grid lines 142a-g and 144a-g are arranged on the display. The grid lines may be shown on the display or they may be virtual and/or hidden from view. The grid lines define a plurality of cells. An example of one cell 146 is shown with the portions of the gird lines 142e, 142f, 144f and 144g highlighted as a boarder 145 of the cell 146. The grid lines and corresponding cells may cover only a portion of the display. However, they may also substantially, or entirely cover the display area of the touch screen input display, for example as shown in FIG. 4 and the tablet computer 150 of FIG. 5.

While cells can be defined in a variety of manners on the display, according to certain embodiments the arranged grid defines a matrix of for example, 4×4 cells, 5×5 cells, 4×8 cells, or 8×8 cells. Each side of the grid may have at least three grid lines defining at least 4 rows. The number of rows and columns may be equal or not.

According to certain embodiments, the plurality of defined cells on a touch screen display of an electronic device are preassigned to correspond to either; a base note, first ordered arranged voice, second ordered arranged voice, third ordered arranged voice or fourth ordered arranged voice. Additionally, they may be also preassigned to a particular octave as well.

For example, in a 5×5 matrix the 5 voices of the set of voices may be assigned to each of the five columns. The five rows may then be assigned to 5 different octaves. Therefore, each cell would be preassigned to a particular voice and a particular octave. E.g. each cell in the first column (for example the far left column) can always correspond to the base note in the set of voices.

The distribution as described above can then be repeated to some or all octaves, i.e. pressing the cell in the bottom left corner will produce a pitch which is one octave lower than when pressing the cell immediately above it.

Additionally, in a grid having more or less rows and/or columns then desired voices and/or chords, the cells can be preassigned voices and octaves in a number of manners. One example is that the pitches are assigned to cells in the grid in such a manner that the lower left cell contains the absolute lowest pitch of the assigned pitches, the top right cell contains the absolute highest pitch of the assigned pitches, and the pitches increase both left to right and bottom to top within the grid. Pitches may be repeated within the grid. For example, the cell in the bottom left corner may be the absolute lowest pitch always and the cell immediately to the right and immediately above may be the next successive voice in the same octave.

Figure 5:
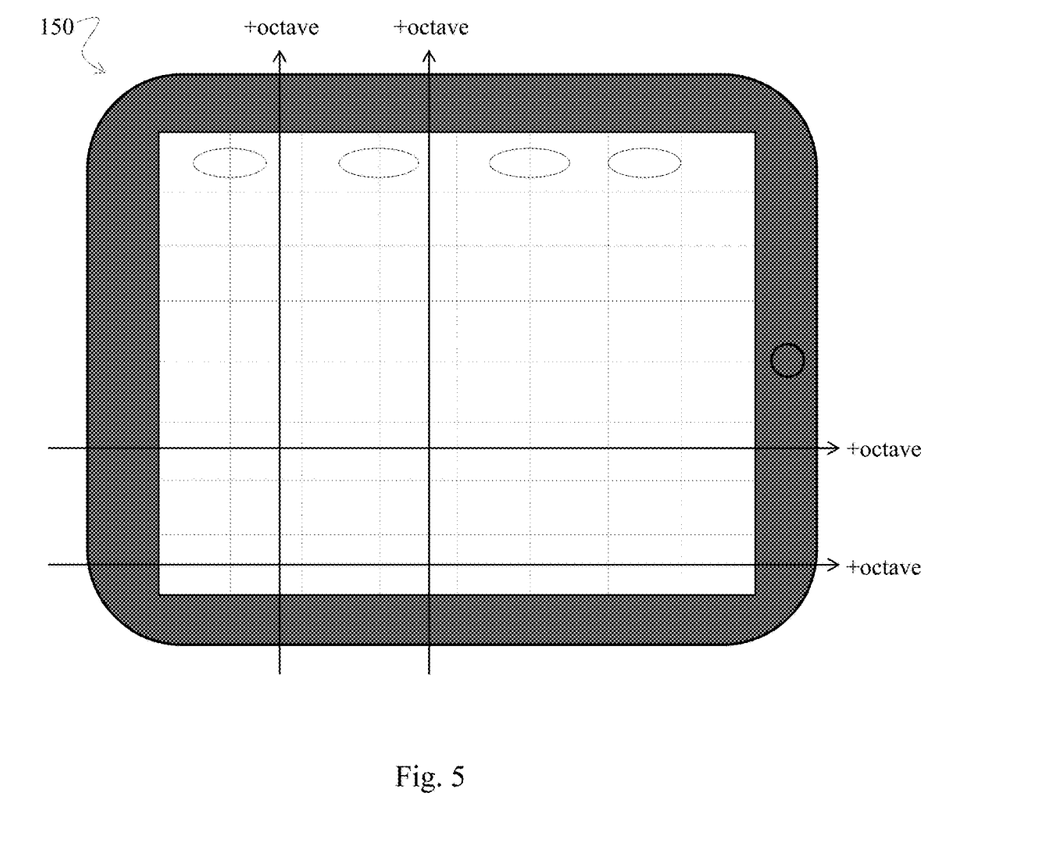
FIG. 5 shows an example of a tablet computer having a touch screen display and user interface according to an aspect of the present invention.

The graphical user interface on the electronic device may also include one or more buttons/icons, e.g. 148, for example on the top portion of the screen. The icons may be on an additional row above and/or removed from the defined cells. They may also be within a cell and/or straddling two or more cells. Multiple examples are shown in FIGS. 4 and 5. Similar to the grid lines, the icons may be displayed to the user or they may be hidden from the user. When temporarily hidden from the user they can be displayed in response to some event or action by the user.

Additionally, the input chord can change during play. The input chord can change in a variety of manners. For example, a set of chords, or the chord progression of a song can be input in to the computer program product as described above. The chords may be accompanied by some timing information. In such instances, the input chord can change according to the timing information. Additionally, the chord may be manually changed by the user. For instance, a predetermined key, icon or button, e.g. button/icon 148, can change the input chord to the subsequently loaded chord when pressed. Still yet, if the computer program product detects a change in chord in an audio file, audio stream and/or attached chord information, the computer program product can change the input chord as appropriate. Numerous other arrangements will be recognized for changing the input chord before, during or after play.

Once a new chord is input, the computer program product can, for example, obtain a new input chord, disassemble the new chord into at least one base note and a plurality of individual voices, and arrange a predetermined number of voices of the chord according to at least one predefined rule and reassigning a new set of pitches corresponding to the new base note and new arranged predetermined number of voices of the new chord to said plurality of defined cells on a touch screen display of the electronic device in response to an event.

The computer program product described herein can be loaded on, or accessible to any variety of electronic devices a touch screen display as defined above. According to certain embodiments of the present invention, there are herein provided electronic devices having a touch screen display, a processor and a computer readable storage medium, said computer readable storage medium having stored there on a computer program product as described herein.

The electronic device may further comprise a predefined set of base notes and voices corresponding to a plurality of chords stored on said computer readable storage medium. Still yet, the electronic device may further comprise a midi manipulation database, stored on said computer readable storage medium, for outputting pitches associated with actuated defined cells on a touch screen display.

Furthermore, the graphical user interface of the present invention, having said plurality of optionally visible grid lines and potentially one or more buttons/icons 148 may be overlaid on a background. The background may be a video which includes or has associated with it an audio source. The user can then play along with the video by selecting or actuating certain cells directly on top of the background. The background may be a prerecorded video which merely plays in the background or the background may be responsive to the user's inputs.

When a user selects one or more cells the selected cells may be indicated to the user in any known fashion, e.g. highlighting, changing transparency, highlighting the boarder, etc. The cells may be indicated in this manner even if the grid lines are not displayed.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A non-transitory computer-readable storage medium storing a program for causing an electronic device having a touch screen input device to provide a graphical user interface for allowing a user to play or improvise music, said program being configured to cause the electronic device to execute the method comprising the steps of:
   defining a plurality of cells on a touch screen input display of the electronic device, obtaining an input chord,
   disassembling the chord into at least one base note and a plurality of individual voices,
   arranging a predetermined number of voices of the chord according to at least one predefined rule, and
   assigning a first set of pitches to a first plurality of said cells, said first set of pitches corresponding to the base note and arranged predetermined number of voices of the chord in a first octave, and
   assigning a second set of pitches to a second plurality of said cells, said second set of pitches corresponding to the base note and arranged predetermined number of voices of the chord in a second octave.

2. The non-transitory computer-readable storage medium according to claim 1, wherein defining a plurality of cells on a touch screen input display comprises arranging a grid which covers substantially the entire display area of the touch screen input display and wherein the plurality of cells are defined as the cells within arranged grid.

3. The non-transitory computer-readable storage medium according to claim 2, wherein the arranged grid defines a matrix of at least 4×4 cells.

4. The non-transitory computer-readable storage medium according to claim 1, wherein
   the plurality of defined cells of the electronic device are preassigned to correspond generally to a base note, a first ordered arranged voice, a second ordered arranged voice, a third ordered arranged voice or a fourth ordered arranged voice, each for a particular octave,
   wherein each set of arranged predetermined number of voices of the chord are for a particular octave and are ordered in relation to their distance from an anchor key, wherein the first ordered arranged voice corresponds to the arranged voice furthest from the anchor key, and
   retrieving the base note or arranged and ordered voice of the chord for each cell upon the cell being activated by an input on the touch screen input device.

5. The non-transitory computer-readable storage medium according to claim 1, further comprising;
   obtaining a new input chord,
   disassembling the new chord into at least one base note and a plurality of individual voices,
   arranging a predetermined number of voices of the chord according to at least one predefined rule, and
   reassigning at least one new set of pitches corresponding to the new base note and new arranged predetermined number of voices of the new chord to said plurality of cells of the electronic device in response to an event.

6. The non-transitory computer-readable storage medium according to claim 5, wherein said event is a predefined user action or the change of chord to the new chord from either an audio source or a computer readable source associated with an audio source.

7. The non-transitory computer-readable storage medium according to claim 1, wherein pitches are assigned to cells in the grid in such a manner that the lower left cell contains the absolute lowest pitch of the assigned pitches, the top right cell contains the absolute highest pitch of the assigned pitches, and the pitches increase both left to right and bottom to top within the grid.

8. The non-transitory computer-readable storage medium according to claim 1, further comprising displaying a video source behind the plurality of cells, wherein the video source is associated with at least one audio source and optionally a chord source from which the chord information is obtained.

9. An electronic device comprising;
   a touch screen input device and a corresponding display, and
   a non-transitory computer-readable storage medium storing a program for causing an electronic device having a touch screen input device to provide a graphical user interface for allowing a user to play or improvise music, said program being configured to cause the electronic device to execute the method comprising the steps of:

defining a plurality of cells on a touch screen input display of the electronic device, obtaining an input chord, disassembling the chord into at least one base note and a plurality of individual voices, arranging a predetermined number of voices of the chord according to at least one predefined rule, and assigning a first set of pitches to a first plurality of said cells, said first set of pitches corresponding to the base note and arranged predetermined number of voices of the chord in a first octave, and assigning a second set of pitches to a second plurality of said cells, said second set of pitches corresponding to the base note and arranged predetermined number of voices of the chord in a second octave.

10. A non-transitory computer-readable storage medium storing a program for causing an electronic device having a touch screen input device to provide a graphical user interface for allowing a user to play or improvise music, said program being configured to cause the electronic device to execute the method comprising the steps of:

defining a plurality of cells on a touch screen input display of the electronic device, obtaining an input chord, disassembling the chord into at least one base note and a plurality of individual voices, arranging a predetermined number of voices of the chord according to at least one predefined rule, assigning at least one set of pitches to a plurality said cells, said set of pitches corresponding to the base note and arranged predetermined number of voices of the chord, and displaying a video source behind the plurality of cells, wherein the video source is associated with at least one audio source and optionally a chord source from which the chord information is obtained.

* * * * *